United States Patent
Blacquiere et al.

(10) Patent No.: US 7,428,196 B2
(45) Date of Patent: Sep. 23, 2008

(54) WRITING DATA TO AN OPTICAL DISC

(75) Inventors: Johannis Friso Rendert Blacquiere, Eindhoven (NL); Cornelis Marinus Schep, Eindhoven (NL); Aalbert Stek, Eindhoven (NL); Theodorus Petrus Henricus Gerardus Jansen, Eindhoven (NL)

(73) Assignee: Koninklijke Philips Electronics N.V., Eidhoven (NL)

( * ) Notice: Subject to any disclaimer, the term of this patent is extended or adjusted under 35 U.S.C. 154(b) by 625 days.

(21) Appl. No.: 10/540,802

(22) PCT Filed: Dec. 1, 2003

(86) PCT No.: PCT/IB03/05696

§ 371 (c)(1),
(2), (4) Date: Jun. 27, 2005

(87) PCT Pub. No.: WO2004/059644

PCT Pub. Date: Jul. 15, 2004

(65) Prior Publication Data

US 2006/0044971 A1    Mar. 2, 2006

(30) Foreign Application Priority Data

Dec. 30, 2002    (EP)    .................................. 02080593

(51) Int. Cl.
*G11B 27/22*    (2006.01)
*G11B 7/00*    (2006.01)
*G11B 5/09*    (2006.01)

(52) U.S. Cl. .................................. 369/47.28; 369/53.36

(58) Field of Classification Search ....................... None
See application file for complete search history.

(56) References Cited

U.S. PATENT DOCUMENTS

| 4,558,446 | A | * | 12/1985 | Banba et al. | ................. | 714/710 |
| 5,850,566 | A | * | 12/1998 | Solan et al. | .................... | 710/5 |
| 6,434,100 | B1 | * | 8/2002 | Usui | ........................ | 369/53.31 |
| 6,771,575 | B1 | * | 8/2004 | Park et al. | ................. | 369/47.14 |
| 7,242,642 | B2 | * | 7/2007 | Endo et al. | ................ | 369/30.05 |
| 2001/0043539 | A1 | | 11/2001 | Kuribayashi et al. | | |

FOREIGN PATENT DOCUMENTS

| EP | 798710 | A2 | * | 10/1997 |
| EP | 1176586 | A2 | * | 1/2002 |

* cited by examiner

*Primary Examiner*—Joseph Feild
*Assistant Examiner*—Peter Vincent Agustin
(74) *Attorney, Agent, or Firm*—Michael E. Belk

(57) ABSTRACT

When writing data to an optic disc with a constant linear velocity, and encountering a disc error, data is written into the defect management area of the disc without changing the rotational speed of the disc, or at least without changing the rotational speed of the disc sufficiently to maintain a constant linear velocity. This allows an increase in the rate at which data may be written to the optical disc. It also avoids or reduces the need for the rotational speed of the disc to be changed, which allows a further improvement in the time taken to write data to the disc. In order to continue writing data to the disc without changing the rotational speed, the data rate must be increased while writing to the defect management area. For this to be possible, the data must be written into an "iced" or unformatted part of the defect management area.

15 Claims, 2 Drawing Sheets

WRITING DATA TO AN OPTICAL DISC

TECHNICAL FIELD OF THE INVENTION

This invention relates to optical discs, and in particular to a method and apparatus for writing data to an optical disc.

BACKGROUND OF THE INVENTION

Optical discs are commonly used for data storage. That is, data is written to and read from such discs, by means of an optical source.

In order to maximize the data storage capacity of an optical disc, data is written to the disc with a fixed data density. That is, the spatial separation of the data points on the disc is constant. In order to allow a constant data rate, while data is being written to or read from the disc, the disc is rotated with a constant linear velocity (CLV). That is, the angular velocity varies, as the optical source moves from one part of the optical disc to another. Specifically, the disc rotates with a higher angular speed when data is being written to or read from an inner part of the disc, and with a lower angular speed when data is being written to or read from the outer part of the disc.

Different optical disc formats are known, and, in some formats, a disc is provided with one or more defect management areas, which may for example be located in the radially outer part of the disc. One such format is defined in the Mount Rainier specification, which is described for example in the document "Mt Rainier An Explanation" published by Koninklijke Philips Electronics NV, and available on the internet in November/December 2002 at www.mt-rainier.org. The defect management area may be used when writing data to the disc. If an error occurs while writing data to the disc, for example because of a defect in the disc, the data is written to the defect management area of the disc instead.

However, as mentioned above, in order to maintain the same data rate (that is, the same number of bits of data which are written to the disc each second), while writing to the outer area of the disc, it is necessary to decrease the rotational speed of the disc. Similarly, when writing to the defect management area has ended, it is again necessary to change the rotational speed of the disc, when returning to writing data into the main data region of the disc.

This has the disadvantage that it takes a noticeable time for the rotational speed of the disc to be changed to the required value, with the necessary degree of accuracy. As a result, writing data into the defect management area significantly increases the time taken to write the data. Similar problems arise when reading data which has been written into the defect management area.

SUMMARY OF THE INVENTION

According to an aspect of the present invention, these problems associated with the prior art are at least partly alleviated by writing data into the defect management area of the disc without changing the rotational speed of the disc, or at least without changing the rotational speed of the disc sufficiently to maintain a constant linear velocity.

This allows an increase in the rate at which data may be written to the optical disc. It also avoids or reduces the need for the rotational speed of the disc to be changed, which allows a further improvement in the time taken to write data to the disc.

In order to continue writing data to the disc without changing the rotational speed, it follows that the data rate must be increased while writing to the defect management area. For this to be possible, the data must be written into an "iced" or unformatted part of the defect management area.

DETAILED DESCRIPTION OF PREFERRED EMBODIMENTS

Figure 1:
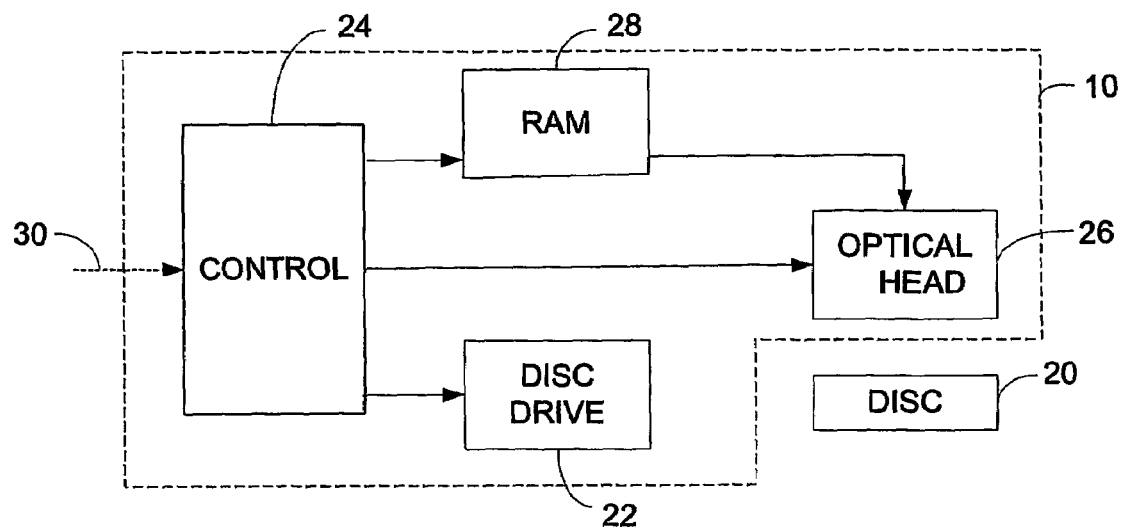
FIG. 1 is a block schematic diagram of an optical disc writing device, in accordance with an aspect of the present invention.

FIG. 1 shows a DVD+RW writer device 10, for writing data to an optical disc 20. The device 10 operates in the DVD+RW format, for example as defined in the Mount Rainier standard. The disc 20 is mounted on a turntable (not shown), which is rotated under the control of a disc drive 22, which is in turn controlled by control circuitry 24. The control circuitry 24 also controls the operation of an optical head 26, which generates the optical signals which are used to write data onto the disc 20. The optical head 26 uses data which are stored in a memory, for example a RAM 28, again under the control of the control circuitry 24.

It should be noted that, although the control circuitry is shown as a single block, this may be in the form of one or more circuit blocks, plus associated components.

The control circuitry 24 has an input bus 30 which, in the writing process, is used for receiving data from a host computer or other device.

Thus, for a given rate at which data is to be written onto the disc 20, and for a given radial position of the optical head 26 relative to the disc 20, the control circuitry 24 ensures that the disc drive 22 causes the disc 20 to rotate at the intended rotational speed. The intended rotational speed R is given by:

$$R = D \cdot s / C \qquad (1)$$

where:
D is the intended data rate in bits per second;
s is the spatial separation of the data bits on the disc; and
C is the circumference of the disc at that radial position.

Figure 2:
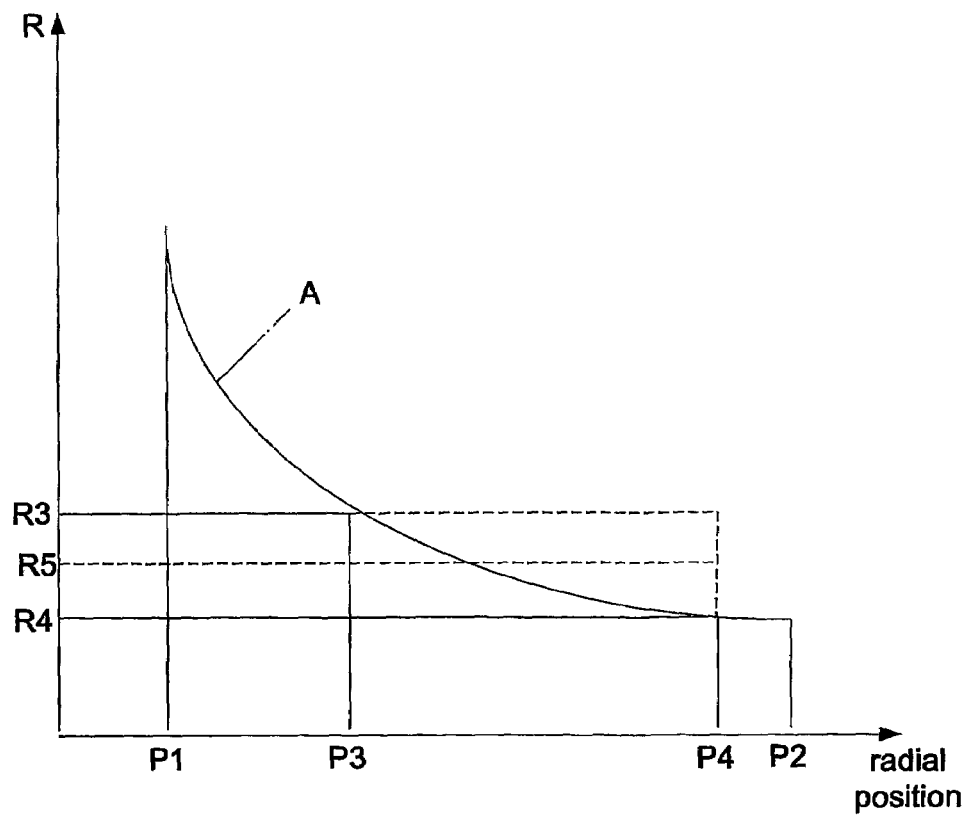
FIG. 2 shows relationships between the rotational speed of an optical disc and the radial position of the optical head of the disc writing device.

FIG. 2 shows relationships between the radial position of the optical head 26 relative to the disc 20, and the intended rotational speed R. Specifically, the line A illustrates the relationship given in equation (1) above, for radial positions between P1 at the inner edge of the disc and P2 at the outer edge of the disc.

As described so far, the system is conventional, and so it will not be described in more detail, as the necessary information is well known to the person skilled in the art. However, the detail of the operation of the device, under the control of the control circuitry 24 is different from the control of known devices, as will be described further below.

Figure 3:
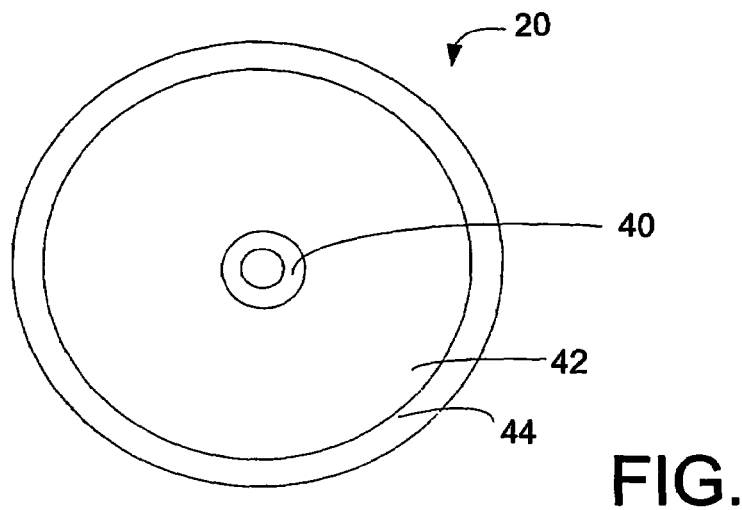
FIG. 3 shows an optical disc for use in connection with the invention.

FIG. 3 shows an optical disc 20 for use in accordance with the invention. The disc 20 has an inner region 40, which includes a lead-in area, a general data storage area 42, and an outer region 44 (not shown in more detail).

As described in the document "Mount Rainier An Explanation", referenced above, the outer region 44 of the disc 20 includes a defect management area, to which data may be written in the event of an error while writing to the main data storage area 42 of the disc 20.

To allow its use in the present invention, the defect management area needs to be at least partially iced. That is, at least a part of the defect management area is unformatted. It is known, for example from U.S. patent application U.S. 2001/0043539 A1, that a DVD+RW drive is able to write data to an unformatted region of a disc at a higher linear velocity, and hence at a higher data rate, than when writing data to a region in which data has already been recorded, including a formatted region of the disc.

A new disc is completely iced, and so no action needs to be taken to ensure that there is a suitable iced region in the defect management area.

However, if the disc has previously been used, it is possible that the defect management area will not be completely iced. Indeed, according to one existing version of the Mount Rainier standard, a disc (including the defect management area) should be fully de-iced, or a temporary lead-out should be written before any iced area.

If the defect management area is partly de-iced, for example because data has previously been written to a section of the defect management area, then it is possible to locate a region of the defect management area which remains iced.

If the defect management area is entirely de-iced, for example because data has previously been written to the whole defect management area, or because the disc has been formatted, then it is possible to "re-ice" the defect management area or a region of the defect management area, preferably during a background process before beginning to write data to the disc.

FIG. 3 is a flow chart showing a method of writing data to the disc 20, in accordance with the present invention.

The illustrated process begins with step 46, which takes place as part of a background process, before the writing of data begins. In step 46, it is determined whether the defect management area of the disc includes an iced area. If so, no further action is required, and it is determined that the disc is ready for data to be written to it.

However, if it is determined in step 46 that there is no iced region in the defect management area of the disc, the process passes to step 48. In step 48, again as part of the background process before beginning to write data to the disc, one or more regions in the defect management area of the disc is re-iced. The location of the iced area or areas is stored in a Formatting Disc Control Block (FDCB) on the disc.

In step 50, a block of data is written to the main data storage area on the disc 20. In step 52, it is determined whether an error has occurred in writing this data. Assuming that there is no error, the procedure passes to step 54, in which it is determined whether there is any further data remaining to be written. If no further data remains, the process passes to step 56 (described below) but, if there is more data remaining to be written, the process returns to step 50 and the writing of the data resumes.

If it is determined in step 52 that there was an error writing the block of data to the intended section of the main data storage area, the process passes to step 58. In step 58, an iced area in the defect management area 42 is identified, and the procedure then passes to step 60. As mentioned above, the defect management area may be entirely iced, or partly iced. In either case, it is necessary to locate an iced area which is free for data storage. For example, as mentioned above, this information may be stored in the Formatting Disc Control Block (FDCB) on the disc.

In accordance with the invention, the disc drive 22 is caused to rotate at the same rotational speed, when writing to the iced area in the defect management area 42, as would have been used when writing to the intended location in the main data storage area of the disc.

This is illustrated in FIG. 2. Thus, in the case of an error occurring while writing to the disc at the radial position P3 and at a corresponding rotational speed R3, data may be written to an iced area in the defect management area at a radial position P4. However, instead of reducing the rotational speed of the disc to R4, as line A would indicate, the rotational speed of the disc is maintained at R3.

Based on equation (1) above, therefore, it can be seen that, since the circumference of the disc will be larger at that radius, and since it is necessary to maintain the spatial separation of the data bits at the same value, the data rate must be increased.

In step 60, therefore, the control circuitry 24 determines the data rate which is necessary to allow the rotational speed to be maintained at the previous value, and, in step 62 of the process, the control circuitry 24 controls the RAM 28 to output data to the optical head 26 at the necessary increased data rate, and controls the optical head 26 to write the data into the disc management area at the increased data rate.

In an alternative embodiment of the invention, the disc drive 22 may not be caused to rotate at exactly the same rotational speed, when writing to the iced area in the disc management area 42, as would have been used when writing to the intended location in the main data storage area of the disc. Instead, when writing to the iced area in the disc management area 42, the disc drive 22 may be caused to rotate at some speed which is less than the speed which would have been used when writing to the intended location in the main data storage area of the disc, but which still requires that data be written at a higher data rate than normal, based on equation (1) above. Using FIG. 2 to illustrate this again, in the case of an error occurring while writing to the disc at the radial position P3 and at a corresponding rotational speed R3, and with the data being written instead to an iced area in the defect management area at the radial position P4, the rotational speed of the disc may be reduced to some speed R5, where R3>R5>R4.

When data has been written to the iced area in step 62, the process passes to step 54, in which it is determined whether there is more data remaining, as described above.

When the writing is completed, the process passes to step 56. At this stage, in order to ensure that the disc complies with the Mount Rainier standard, any necessary re-formatting is performed. For example, if the disc is not yet completely written and de-iced, the defect management area at the outer side of the disc is copied after the last user data, so that the lead-out occurs immediately after this copy of the defect management area, ensuring DVD-ROM compatibility. Alternatively, if the user data area of the disc is completely written, any remaining iced areas in the defect management area are de-iced. The process then passes to step 57, and ends.

Figure 4:
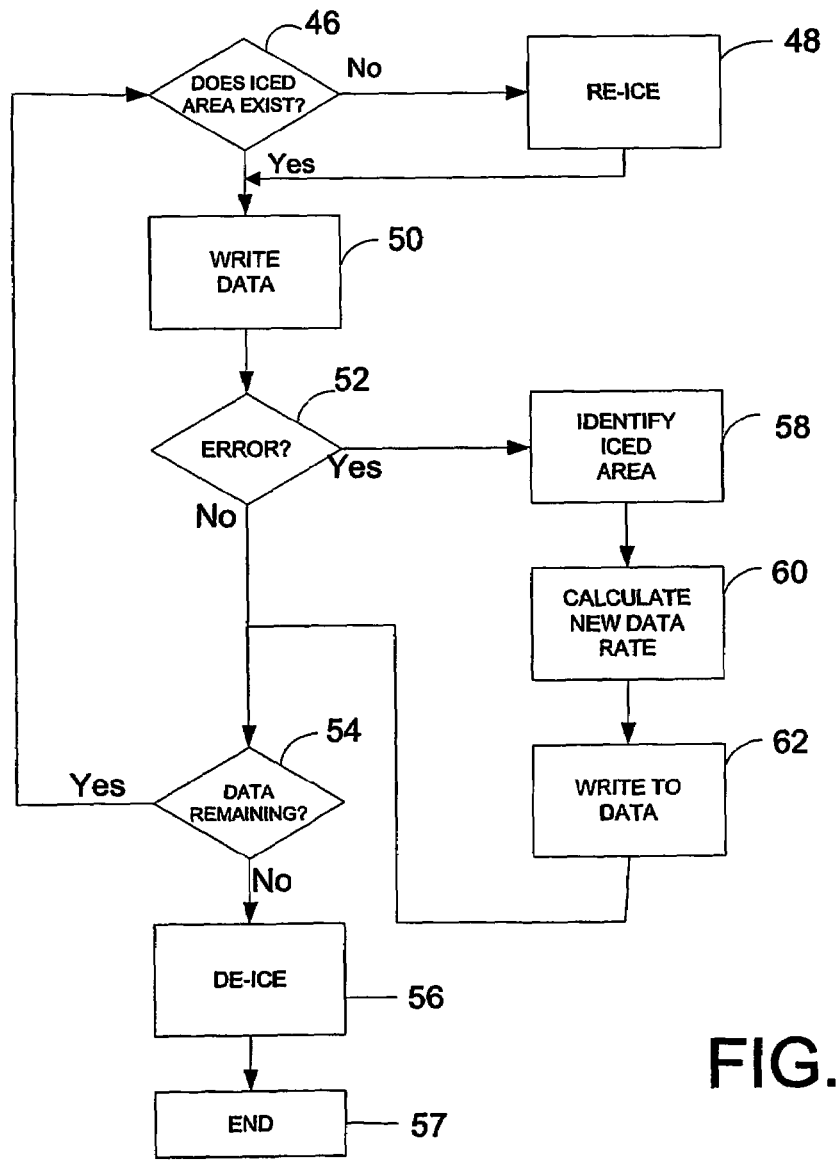
FIG. 4 is flow chart illustrating a method in accordance with an aspect of the present invention.

It will be noted that this description, and the flow chart of FIG. 4, assume that there is sufficient time for the re-icing of a region in the defect management area to be completed (in step 48), before starting to write data to the disc (in step 50). However, in some situations it is required to begin writing data to the disc immediately on insertion. In that case, it is not possible to re-ice the disc, or to complete re-icing of the disc, before beginning writing data to the disc. If an error then occurs, data is written to the defect management area in the conventional way, that is, at a constant data rate, and therefore at a reduced rotational speed of the disc.

In that case, the necessary background process, to re-ice a region of the defect management area, can be carried out when the user stops writing data to, or reading data from, the disc.

Once data has been written to the disc, it must then be read from the disc. In some situations, it will also be possible to maintain the rotational speed of the disc constant, even when reading data from the defect management area. Of course, in order to be able to do this, it will be necessary for the disc reader to be able to read data at a higher data rate than normal.

There is therefore disclosed an optical disc writing apparatus, and a method for use in such an apparatus, which allows more efficient writing of data onto the disc, in particular when writing data to a defect management area.

It should be noted that the term "comprises" or "comprising", as used herein, means that the stated features or elements are present, but does not exclude the possibility that additional features or elements may also be present. Similarly, the word "a" or "an" does not exclude the possibility that a plurality of the stated features may be present.

The invention claimed is:

1. A method of writing data to an optical disc, the method comprising:
   controlling a disc drive such that the optical disc is rotated at a first rotational speed which corresponds to a constant linear velocity, and
   writing data to the optical disc at a first data rate; and
   in the event of an error writing data to the optical disc;
   writing data into an unformatted region of a defect management area of the optical disc at a second data rate which is higher than the first data rate.

2. A method as claimed in claim 1, comprising, in the event of an error writing data to the optical disc, controlling the disc drive such that the optical disc continues to rotate at the first rotational speed.

3. A method as claimed in claim 1, comprising, in the event of an error writing data to the optical disc, controlling the disc drive such that the optical disc is rotated at a second rotational speed which is less than the first rotational speed.

4. A method as claimed in claim 1, the method comprising, before writing data to the optical disc, ensuring that the defect management area of the disc comprises at least one unformatted region.

5. A method as claimed in claim 4, wherein the method comprises, before writing data to the optical disc, determining whether the defect management area of the disc has at least one unformatted region and, if not, deformatting at least one region thereof.

6. A method as claimed in claim 5, comprising performing the deformatting as a background process.

7. A method as claimed in claim 1, further comprising, after writing data to the optical disc, formatting any remaining unformatted region of the defect management area of the optical disc.

8. An optical disc writer, comprising a disc drive for rotating the optical disc,
   wherein the disc writer is adapted to write data to the optical disc at a first data rate while the optical disc is rotated at a first rotational speed which corresponds to a constant linear velocity, and
   wherein the disc writer is further adapted, in the event of an error writing data to the optical disc to write data into an unformatted region of a defect management area of the optical disc at a second data rate which is higher than the first data rate.

9. An optical disc writer as claimed in claim 8, wherein the disc writer is adapted, in the event of an error writing data to the optical disc, to control the disc drive such that the optical disc continues to rotate at the first rotational speed.

10. An optical disc writer as claimed in claim 8, wherein the disc writer is adapted, in the event of an error writing data to the optical disc, to control the disc drive such that the optical disc is rotated at a second rotational speed which is less than the first rotational speed.

11. An optical disc writer as claimed in claim 8, wherein the disc writer is adapted, before writing data to the optical disc, to ensure that the defect management area of the disc comprises at least one unformatted region.

12. An optical disc writer as claimed in claim 11, wherein the disc writer is adapted, before writing data to the optical disc, to determine whether the defect management area of the disc has at least one unformatted region and, if not, to deformat at least one region thereof.

13. An optical disc writer as claimed in claim 12, wherein the disc writer is adapted to perform the deformatting as a background process.

14. An optical disc writer as claimed in claim 8, wherein the disc writer is adapted, after writing data to the optical disc, to format any remaining unformatted region of the defect management area of the optical disc.

15. An optical disc writer as claimed in claim 8, wherein the disc writer is a DVD+RW disc writer.

* * * * *